(12) United States Patent
Burton et al.

(10) Patent No.: US 11,386,927 B1
(45) Date of Patent: Jul. 12, 2022

(54) DATA STORAGE DEVICE SYNCHRONIZING FIRST CHANNEL BASED ON SYNC MARK DETECTED IN SECOND CHANNEL

(71) Applicant: Western Digital Technologies, Inc., San Jose, CA (US)

(72) Inventors: Derrick E. Burton, Ladera Ranch, CA (US); Weldon M. Hanson, Rochester, MN (US); Richard L. Galbraith, Rochester, MN (US); Iouri Oboukhov, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/330,675

(22) Filed: May 26, 2021

(51) Int. Cl.
*G11B 20/10* (2006.01)
*G11B 20/18* (2006.01)
*G11B 5/596* (2006.01)
*G11B 5/09* (2006.01)
*G11B 5/012* (2006.01)
*G11B 5/584* (2006.01)

(52) U.S. Cl.
CPC .......... *G11B 5/59616* (2013.01); *G11B 5/012* (2013.01); *G11B 5/09* (2013.01); *G11B 5/584* (2013.01)

(58) Field of Classification Search
CPC ................ G11B 20/10388; G11B 5/56; G11B 20/10037; G11B 20/10046; G11B 5/4969; G11B 5/54; G11B 5/6005; G11B 5/59633; G11B 5/58; G11B 5/584; G11B 5/5508; G11B 5/59688; G11B 20/10222; G11B 20/18

USPC ....... 360/75, 48, 77.02, 77.08, 78.04, 78.14, 360/78.12, 76, 77.07, 50

See application file for complete search history.

(56) References Cited

U.S. PATENT DOCUMENTS

| | | | |
|---|---|---|---|
| 6,918,553 B2 | 7/2005 | Zwettler et al. | |
| 7,054,093 B1 | 5/2006 | Anderson et al. | |
| 7,193,812 B2 | 3/2007 | Eaton | |
| 7,480,117 B2 | 1/2009 | Biskebom et al. | |
| 7,548,395 B2 | 6/2009 | Biskebom et al. | |
| 7,724,459 B2 | 5/2010 | Czarnecki et al. | |
| 8,711,501 B2 | 4/2014 | Childers et al. | |
| 8,780,486 B2 | 7/2014 | Bui et al. | |
| 8,891,197 B2 | 11/2014 | Hancock et al. | |
| 8,982,495 B2 | 3/2015 | Biskebom et al. | |
| 9,013,824 B1 * | 4/2015 | Guo ................... | G11B 5/59655 360/75 |
| 9,208,809 B2 | 12/2015 | Biskebom et al. | |
| 9,449,628 B2 | 9/2016 | Biskebom et al. | |
| 9,892,751 B1 | 2/2018 | Harper | |

(Continued)

*Primary Examiner* — Nabil Z Hindi
(74) *Attorney, Agent, or Firm* — Patterson + Sheridan, LLP; Steven H. Versteeg (57) ABSTRACT

A data storage device configured to access a magnetic tape is disclosed comprising a plurality of data tracks. A first head is configured to access a first data track comprising a first sync mark, and a second head is configured to access a second data track comprising a second sync mark. The first head is used to read first data from the first data track, wherein the first data comprises a plurality of symbols, and the second head is used to read the second sync mark from the second data track. The first data is symbol synchronized based on the second head reading the second sync mark from the second data track.

20 Claims, 5 Drawing Sheets

(56) References Cited

U.S. PATENT DOCUMENTS

2010/0007984 A1* 1/2010 Nakagawa ......... G11B 5/00839
  360/75
2012/0206832 A1 8/2012 Hamidi et al.

* cited by examiner

| SYNC_1 | DATA_1 |
| SYNC_2 | DATA_2 |
| SYNC_3 | DATA_3 |
| SYNC_4 | DATA_4 |
| SYNC_5 | DATA_5 |
| SYNC_6 | DATA_6 |
| SYNC_7 | DATA_7 |
| SYNC_8 | DATA_8 |

DATA STORAGE DEVICE SYNCHRONIZING FIRST CHANNEL BASED ON SYNC MARK DETECTED IN SECOND CHANNEL

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

DETAILED DESCRIPTION

Figure 1A:
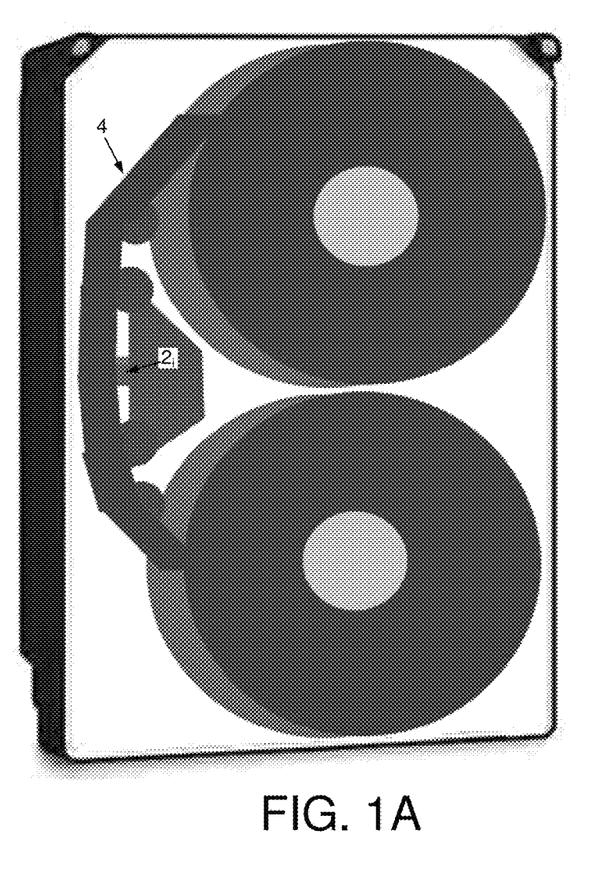
FIG. 1A shows a data storage device according to an embodiment comprising at least one head configured to access a magnetic tape.
Figure 1B:
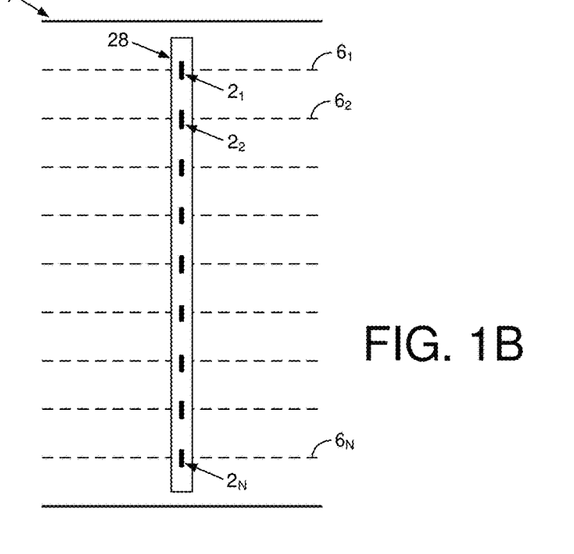
FIG. 1B shows an embodiment wherein the data storage device comprises a head bar comprising a plurality of heads.
Figure 1C:
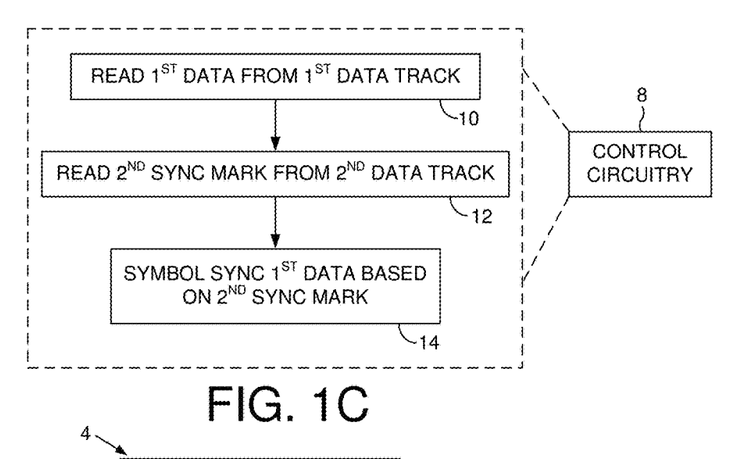
FIG. 1C is a flow diagram according to an embodiment wherein first data read from a first data track is symbol synchronized based on a second sync mark read from a second data track.

FIG. 1A shows a data storage device according to an embodiment comprising a at least one head $2_i$ configured to access a magnetic tape 4 having a plurality of data tracks. FIG. 1B shows an embodiment wherein a first head $2_1$ is configured to access a first data track $6_1$ comprising a first sync mark, and a second head $2_2$ is configured to access a second data track $6_2$ comprising a second sync mark. FIG. 1C shows an embodiment wherein control circuitry 8 is configured to use the first head to read first data from a first data track (block 10), wherein the first data comprises a plurality of symbols, and use the second head to read the second sync mark from the second data track (block 12). The first data is symbol synchronized based on the second head reading the second sync mark from the second data track (block 14).

Figure 1D:
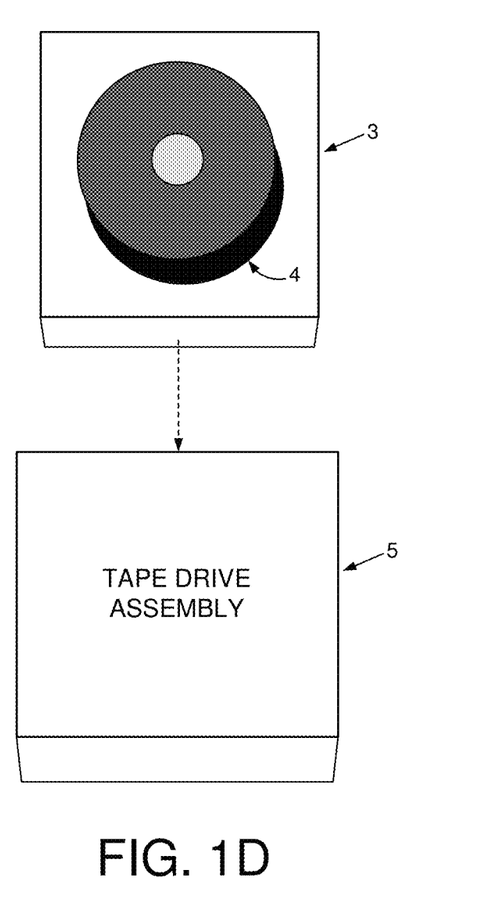
FIG. 1D shows an embodiment wherein the data storage device comprises a tape drive assembly configured to access a magnetic tape housed in a cartridge assembly.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1D, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry configured to execute the flow diagram of FIG. 1B. In the embodiment of FIG. 1D, the magnetic tape 4 is wound around a single reel which may also be employed in the embodiment of FIG. 1A.

In one embodiment, the data written to each data track may be encoded into symbols of an error correction code (ECC), wherein each symbol may comprise multiple bits. During a read operation, a sync mark written with the data (e.g., preceding the data) may be read in order to symbol synchronize the data read from the data track, thereby enabling the error correction code ECC to decode the data. Conventionally, multiple sync marks may be written with the data (e.g., a primary sync mark followed by a secondary sync mark) so that if the primary sync mark is unreadable (corrupted), the data read from the data track may still be symbol synchronized by reading the secondary sync mark. However, recording multiple sync marks when writing to a data track reduces the capacity of the magnetic tape 4 due to the recordable area consumed by the redundant sync mark(s) as well as the length of each sync mark needed to ensure accurate detection.

Figure 2A:
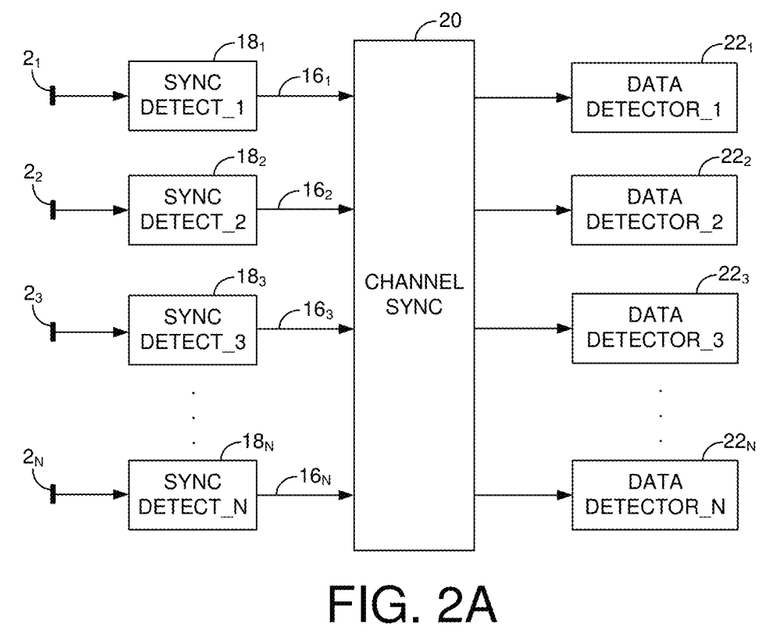
FIG. 2A shows an embodiment wherein a channel sync block symbol synchronizes data read from multiple data tracks.

In one embodiment, the capacity reduction of writing a secondary sync mark is avoided by instead detecting a sync mark of a second read channel in order to symbol synchronize the data of a first read channel. FIG. 2A shows an example of this embodiment wherein while a plurality of heads $2_1$-$2_N$ concurrently read a plurality of data tracks the read data $16_1$-$16_N$ are processed by respective sync mark detectors $18_1$-$18_N$. A channel sync block 20 evaluates the outputs of the sync mark detectors $18_1$-$18_N$ in order to symbol synchronize a data detector $22_1$-$22_N$ of each read channel. In one embodiment when the sync mark of a first read channel is corrupted, the data detector of the first read channel is symbol synchronized based on reading the sync mark of a second read channel, thereby obviating the need to write a secondary sync mark in each data track. For example, when the channel sync block 20 of FIG. 2A determines the first sync mark detector $18_1$ has missed the corresponding sync mark written on the first data track, the channel sync block 20 may symbol synchronize the first data detector $22_1$ based on when the second sync mark detector $18_2$ detects the corresponding sync mark written in the second data track. In one embodiment, the channel sync block 20 may symbol synchronize a data detector of a first read channel based on detecting the sync mark of an adjacent, second read channel. That is, in one embodiment a first read channel may be symbol synchronized using an adjacent read channel due to there being a tighter timing tolerance between adjacent read channels. In another embodiment, a first read channel may be symbol synchronized based on any one of the other read channels that successfully detects the respective sync mark.

Figure 2B:
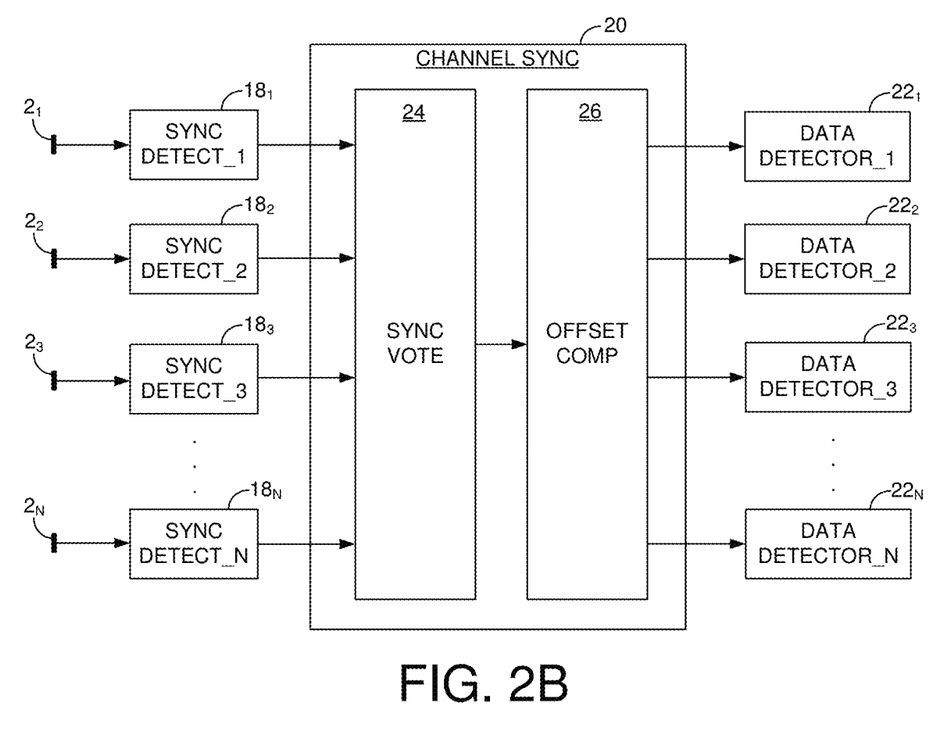
FIG. 2B shows an embodiment wherein the channel sync block comprises a sync vote block and an offset compensation block.

In one embodiment, the channel sync block 20 of FIG. 2A may symbol synchronize at least some of the data detectors 22$_1$-22$_N$ when the sync mark of any one of the read channels is detected. In another embodiment, the channel sync block 20 may symbol synchronize at least some of the data detectors 22$_1$-22$_N$ when M of N of the sync marks of the read channels have been detected. For example in an embodiment employing eight heads, the channel sync block 20 may symbol synchronize at least some of the data detectors 22$_1$-22$_N$ when, for example, any four of the eight sync marks of the eight read channels have been detected. FIG. 2B shows an example of this embodiment wherein the channel sync block 20 comprises a sync vote block 24 configured to process the outputs of the sync mark detectors 18$_1$-18$_N$ to determine when a sufficient number of the sync marks have been detected. In one embodiment, symbol synchronizing at least some of the data detectors 22$_1$-22$_N$ based on detecting M of N sync marks of multiple read channels enables writing shorter sync marks in each data track since symbol synchronizing the read channels based on multiple sync marks is similar to writing multiple consecutive sync marks to a single data track. Accordingly this embodiment may increase the capacity of the magnetic tape 4 by obviating secondary sync marks in each data track, as well as by reducing the length of each sync mark written to each data track.

In the embodiment of FIG. 2B, the channel sync block 20 comprises an offset compensation block 26 configured to compensate for a phase offset between the heads 2$_1$-2$_N$. That is, when there is a relative phase offset between the data read from each data track, the offset compensation block 26 compensates for the phase offset between the read channels when reading the multiple data tracks in order to correctly symbol synchronize at least some of the data detectors 22$_1$-22$_N$.

Figure 3A:
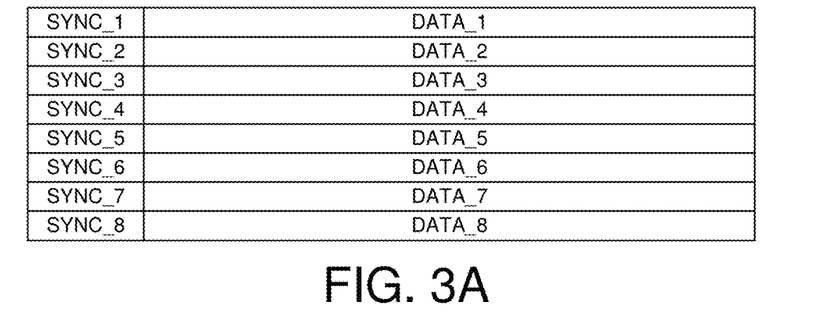
FIG. 3A shows an embodiment wherein the data read from multiple data tracks is aligned in time.
Figure 3B:
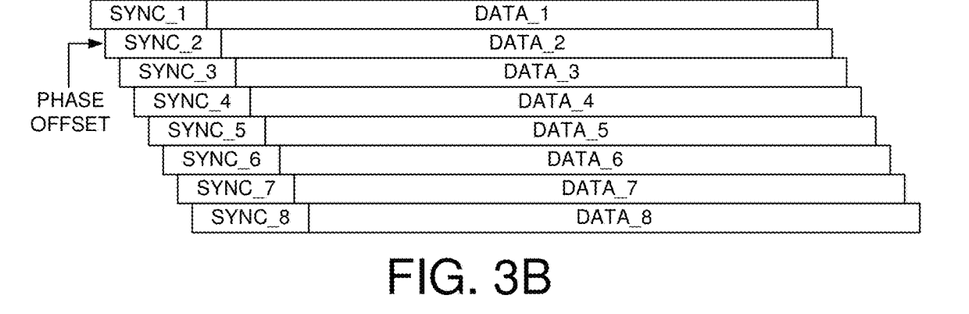
FIGS. 3B-3D show embodiments wherein the data read from multiple data tracks may be offset in time due, for example, to a longitudinal offset between the heads, a tilt angle of a head bar, and/or a path delay when the data is written.
Figure 3C:
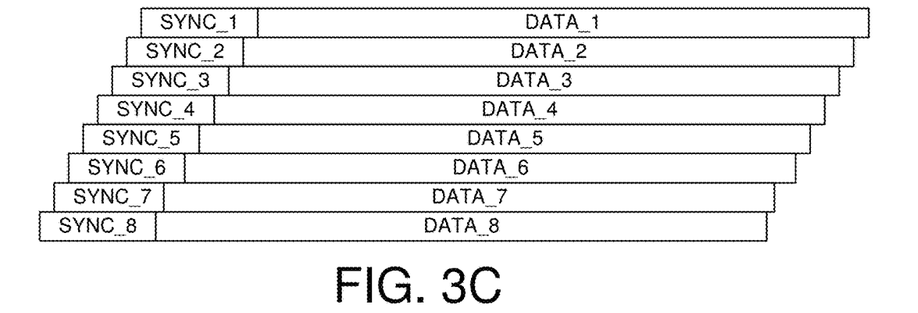
Figure 3D:
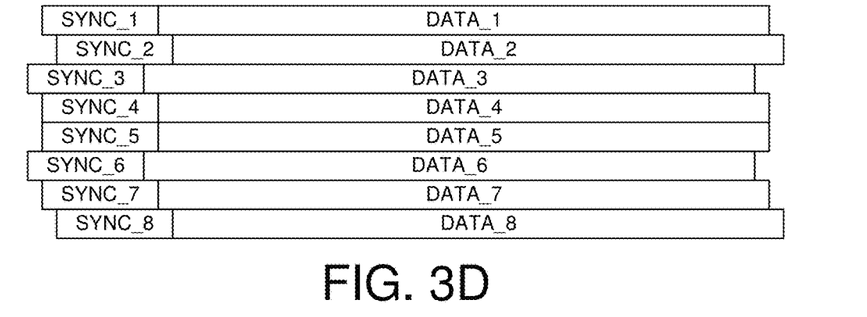
Figure 4:
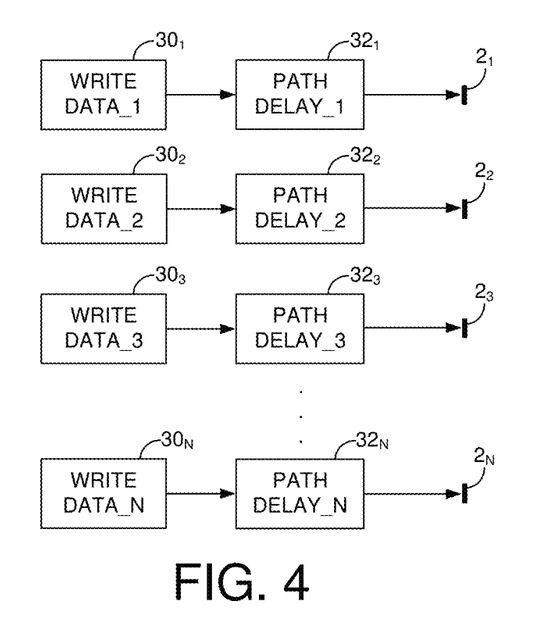
FIG. 4 shows an embodiment wherein the data of multiple data tracks are written with a relative path delay in order to avoid a power transient that may otherwise occur when simultaneously clocking multiple write channels.

FIG. 3A shows an example where all of the read channels (eight in this example) are aligned in time during a read operation such that there is no need to compensate for a phase offset between the read channels. That is in this example, all of the data detectors 22$_1$-22$_N$ of FIG. 2B may be symbol synchronized relative to a common time reference during the read operation, whereas in the examples of FIGS. 3B and 3C there may be a phase offset between the read channels. For example in the embodiment of FIG. 1B, a head bar 28 comprising the plurality of heads 2$_1$-2$_N$ may be tilted (e.g., relative to a center pivot point) in order to compensate for a distortion of the magnetic tape 4 (e.g., a contraction or expansion). However when reading the data tracks 6$_1$-6$_N$, tilting the head bar 28 at an angle different than when writing the data tracks 6$_1$-6$_N$ results in a phase offset between the read channels such shown in FIG. 3B or 3C. FIG. 3D shows an embodiment wherein a phase offset between the read channels may be due to an arbitrary longitudinal offset between the heads 2$_1$-2$_N$ when mounted or fabricated on the head bar 28. FIG. 4 shows an embodiment wherein when writing the data tracks 6$_1$-6$_N$, the write data 30$_1$-30$_N$ may be delayed within each write channel by a predetermined path delay 32$_1$-32$_N$ so as to avoid a power transient that may otherwise occur due to simultaneously clocking the write channels. In this embodiment, the path delays 32$_1$-32$_N$ during the write operation results in a phase offset between the read channels during a read operation, such as shown in FIG. 3B or 3C. Accordingly when symbol synchronizing the data detectors 22$_1$-22$_N$ during a read operation, the offset compensation block 26 of FIG. 2B compensates for a phase offset between the read channels due, for example, to a longitudinal offset of the heads, tilting the head bar, path delays during the write operation, etc.

Any suitable technique may be employed to determine the phase offset between the read channels during a read operation. In an embodiment employing path delays during the write operation such as shown in FIG. 4, the phase offset between the read channels may be configured based on the predetermined path delays. In another embodiment, the phase offset between the read channels may be measured during a calibration procedure. For example, a test pattern may be written to the data tracks 6$_1$-6$_N$ which are then read in order to measure the phase offset between the read channels (e.g., based on when each sync mark in each data track is detected). In one embodiment, the phase offset between the read channel may be measured for different tilt angles of the head bar, that is, at tilt angles that represent a delta between writing and reading the test pattern.

In another embodiment, the phase offset between the read channels may be measured and updated prior to and/or during a read operation. For example, prior to reading a target segment of the data tracks the data tracks may be read in order to read the sync marks in each data track and measure the current phase offset between the read channels (e.g., at the current tilt angle of the head bar 28) based on the relative timing when each sync marks is detected. Similarly when reading the target segment of the data tracks, the phase offset between the read channels may be measured and updated each time a sync mark is successfully detected. When a sync mark is missed (e.g., due to being corrupted), the phase offset for the corresponding read channel is not updated.

In one embodiment, the control circuitry 8 may employ sufficient buffering of the read data when the sync mark of a read channel is missed. For example, when the channel sync block 20 of FIG. 2A determines the sync mark has been missed for a particular data track, the channel sync block 20 may buffer read data for the corresponding data detector. When M of N sync marks from the other read channels are successfully detected, the channel sync block 20 symbol synchronizes the buffered read data and enables the corresponding data detector(s).

In one embodiment, the sync mark may be written with the same pattern of magnetic transitions in each of the data tracks, wherein the sync mark may be detected by correlating read data with the target sync mark pattern. In another embodiment, the sync mark written to a first data track may comprise a first pattern of magnetic transitions and the sync mark written to a second data track may comprise a second pattern of magnetic transitions different from the first pattern. For example, in one embodiment each sync mark of the multiple data tracks may be considered as segments of a concatenated sync mark pattern. In this embodiment, writing different sync mark patterns in at least two data tracks enables the concatenated sync mark pattern to attain any desirable characteristic, such as increasing the propensity for accurate detection. In another embodiment, one of multiple possible sync mark patterns may be written to a data track wherein each sync mark detector 18$_1$-18$_N$ of FIG. 2A may concurrently search for all possible sync mark patterns. For example, in one embodiment any suitable data (e.g., servo data) may be encoded by modulating different sync mark patterns across the data tracks. In an embodiment wherein one of two sync mark patterns may be written to each data track, the data may be binary encoded wherein a "0" bit may be represented by a first sync mark pattern and a "1" bit may be represented by a second sync mark pattern. In this manner, the concatenated sync marks may represent a multi-bit digital value (e.g., an 8-bit value when writing 8 data tracks such as shown in FIG. 3A).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape comprising a plurality of data tracks, the data storage device comprising:
   a first head configured to access a first data track comprising a first sync mark;
   a second head configured to access a second data track comprising a second sync mark; and
   control circuitry configured to:
     use the first head to read first data from the first data track, wherein the first data comprises a plurality of symbols;
     use the second head to read the second sync mark from the second data track; and
     when the first sync mark is corrupted, symbol synchronize the first data based on the second head reading the second sync mark from the second data track.

2. The data storage device as recited in claim 1, wherein:
   the first sync mark comprises a first pattern of magnetic transitions;
   the second sync mark comprises a second pattern of magnetic transitions; and
   the first pattern is the same as the second pattern.

3. The data storage device as recited in claim 1, wherein:
   the first sync mark comprises a first pattern of magnetic transitions;
   the second sync mark comprises a second pattern of magnetic transitions; and
   the first pattern is different from the second pattern.

4. A data storage device configured to access a magnetic tape comprising a plurality of data tracks, the data storage device comprising:
   a first head configured to access a first data track comprising a first sync mark;
   a second head configured to access a second data track comprising a second sync mark; and
   control circuitry configured to:
     use the first head to read first data from the first data track, wherein the first data comprises a plurality of symbols;
     detect the first sync mark when reading the first data track;
     use the second head to read the second sync mark from the second data track;
     symbol synchronize the first data based on the second head reading the second sync mark from the second data track;
     symbol synchronize the first data when the first sync mark is detected; and
     when the first sync mark is not detected, symbol synchronize the first data based on the second head reading the second sync mark from the second data track.

5. A data storage device configured to access a magnetic tape comprising a plurality of data tracks, the data storage device comprising:
   a first head configured to access a first data track comprising a first sync mark;
   a second head configured to access a second data track comprising a second sync mark; and
   control circuitry configured to:
     use the first head to read first data from the first data track, wherein the first data comprises a plurality of symbols;

use the second head to read the second sync mark from the second data track;

symbol synchronize the first data based on the second head reading the second sync mark from the second data track;

measure a phase offset between the first head and the second head; and symbol synchronize the first data based on the second head reading the second sync mark from the second data track and based on the measured phase offset between the first head and the second head.

6. The data storage device as recited in claim 5, further comprising a head bar comprising the first head and the second head, wherein the control circuitry is further configured to:

tilt the head bar at an angle to compensate for a distortion of the magnetic tape; and measure the phase offset between the first head and the second head for a plurality of different tilt angles.

7. A data storage device configured to access a magnetic tape comprising a plurality of data tracks, the data storage device comprising:

a first head configured to access a first data track comprising a first sync mark;

a second head configured to access a second data track comprising a second sync mark; and control circuitry configured to:

use the first head to read first data from the first data track, wherein the first data comprises a plurality of symbols;

use the second head to read the second sync mark from the second data track;

symbol synchronize the first data based on the second head reading the second sync mark from the second data track;

use the first head to first write the first data to the first data track;

use the second head to second write the second data to the second data track, wherein the second write is delayed relative to the first write by a predetermined path delay; and symbol synchronize the first data based on the second head reading the second sync mark from the second data track and based on the predetermined path delay.

8. A data storage device configured to access a magnetic tape comprising a plurality of data tracks, the data storage device comprising:

a first head configured to access a first data track comprising a first sync mark;

a second head configured to access a second data track comprising a second sync mark;

a third head configured to access a third data track comprising a third sync mark; and control circuitry configured to:

use the first head to read first data from the first data track, wherein the first data comprises a plurality of symbols;

use the second head to read second data from the second data track, wherein the second data comprises a plurality of symbols;

use the third head to read third data from the third data track, wherein the third data comprises a plurality of symbols; and when the first sync mark is corrupted, symbol synchronize the first data, the second data, and the third data when at least one of the first sync mark, the second sync mark, or the third sync mark is detected.

9. The data storage device as recited in claim 8, wherein:

the first sync mark comprises a first pattern of magnetic transitions;

the second sync mark comprises a second pattern of magnetic transitions; and the first pattern is the same as the second pattern.

10. The data storage device as recited in claim 8, wherein:

the first sync mark comprises a first pattern of magnetic transitions;

the second sync mark comprises a second pattern of magnetic transitions; and the first pattern is different from the second pattern.

11. A data storage device configured to access a magnetic tape comprising a plurality of data tracks, the data storage device comprising:

a first head configured to access a first data track comprising a first sync mark;

a second head configured to access a second data track comprising a second sync mark;

a third head configured to access a third data track comprising a third sync mark; and control circuitry configured to:

use the first head to read first data from the first data track, wherein the first data comprises a plurality of symbols;

use the second head to read second data from the second data track, wherein the second data comprises a plurality of symbols;

use the third head to read third data from the third data track, wherein the third data comprises a plurality of symbols;

symbol synchronize the first data, the second data, and the third data when at least one of the first sync mark, the second sync mark, or the third sync mark is detected; and symbol synchronize the first data, the second data, and the third data when at least two of the first sync mark, the second sync mark, or the third sync mark is detected.

12. A data storage device configured to access a magnetic tape comprising a plurality of data tracks, the data storage device comprising:

a first head configured to access a first data track comprising a first sync mark;

a second head configured to access a second data track comprising a second sync mark;

a third head configured to access a third data track comprising a third sync mark; and control circuitry configured to:

use the first head to read first data from the first data track, wherein the first data comprises a plurality of symbols;

use the second head to read second data from the second data track, wherein the second data comprises a plurality of symbols;

use the third head to read third data from the third data track, wherein the third data comprises a plurality of symbols;

symbol synchronize the first data, the second data, and the third data when at least one of the first sync mark, the second sync mark, or the third sync mark is detected;

measure a phase offset between the heads; and symbol synchronize the first data, the second data, and the third data based on measured phase offset between the heads.

13. The data storage device as recited in claim 12, further comprising a head bar comprising the first head, the second head, and the third head, wherein the control circuitry is further configured to:
   tilt the head bar at an angle to compensate for a distortion of the magnetic tape; and
   measure the phase offset between the heads for a plurality of different tilt angles.

14. A data storage device configured to access a magnetic tape comprising a plurality of data tracks, the data storage device comprising:
   a first head configured to access a first data track comprising a first sync mark;
   a second head configured to access a second data track comprising a second sync mark;
   a third head configured to access a third data track comprising a third sync mark; and
   control circuitry configured to:
      use the first head to read first data from the first data track, wherein the first data comprises a plurality of symbols;
      use the second head to read second data from the second data track, wherein the second data comprises a plurality of symbols;
      use the third head to read third data from the third data track, wherein the third data comprises a plurality of symbols;
      symbol synchronize the first data, the second data, and the third data when at least one of the first sync mark, the second sync mark, or the third sync mark is detected;
      use the first head to first write the first data to the first data track;
      use the second head to second write the second data to the second data track, wherein the second write is delayed relative to the first write by a first predetermined path delay;
      use the third head to third write the third data to the third data track, wherein the third write is delayed relative to the first write by a second predetermined path delay; and
      symbol synchronize the first data, the second data, and the third data based on the first and second path delays.

15. A data storage device configured to access a magnetic tape comprising a plurality of data tracks, the data storage device comprising:
   a first head configured to access a first data track comprising a first sync mark;
   a second head configured to access a second data track comprising a second sync mark;
      a means for using the first head to read first data from the first data track, wherein the first data comprises a plurality of symbols;
      a means for using the second head to read the second sync mark from the second data track; and
      a means for symbol synchronizing the first data based on the second head reading the second sync mark from the second data track when the first sync mark is corrupted.

16. The data storage device as recited in claim 15, wherein:
   the first sync mark comprises a first pattern of magnetic transitions;
   the second sync mark comprises a second pattern of magnetic transitions; and
   the first pattern is the same as the second pattern.

17. The data storage device as recited in claim 15, wherein:
   the first sync mark comprises a first pattern of magnetic transitions;
   the second sync mark comprises a second pattern of magnetic transitions; and
   the first pattern is different from the second pattern.

18. A data storage device configured to access a magnetic tape comprising a plurality of data tracks, the data storage device comprising:
   a first head configured to access a first data track comprising a first sync mark;
   a second head configured to access a second data track comprising a second sync mark;
   a means for using the first head to read first data from the first data track, wherein the first data comprises a plurality of symbols;
   a means for detecting the first sync mark when reading the first data track;
   a means for using the second head to read the second sync mark from the second data track;
   a means for symbol synchronizing the first data based on the second head reading the second sync mark from the second data track;
   a means for symbol synchronizing the first data when the first sync mark is detected; and
   when the first sync mark is not detected, a means for symbol synchronize the first data based on the second head reading the second sync mark from the second data track.

19. A data storage device configured to access a magnetic tape comprising a plurality of data tracks, the data storage device comprising:
   a first head configured to access a first data track comprising a first sync mark;
   a second head configured to access a second data track comprising a second sync mark;
   a means for using the first head to read first data from the first data track, wherein the first data comprises a plurality of symbols;
   a means for using the second head to read the second sync mark from the second data track;
   a means for symbol synchronizing the first data based on the second head reading the second sync mark from the second data track;
   a means for measuring a phase offset between the first head and the second head; and
   a means for symbol synchronizing the first data based on the second head reading the second sync mark from the second data track and based on the measured phase offset between the first head and the second head.

20. The data storage device as recited in claim 19, further comprising:
   a head bar comprising the first head and the second head;
   a means for tilting the head bar at an angle to compensate for a distortion of the magnetic tape; and
   a means for measuring the phase offset between the first head and the second head for a plurality of different tilt angles.

* * * * *